United States Patent [19]

Holt et al.

[11] Patent Number: 4,944,930

[45] Date of Patent: Jul. 31, 1990

[54] SYNTHESIS OF FINE-GRAINED α-SILICON NITRIDE BY A COMBUSTION PROCESS

[75] Inventors: J. Birch Holt, San Jose; Donald D. Kingman, Danville; Gregory M. Bianchini, Livermore, all of Calif.

[73] Assignee: Regents of the University of California, Oakland, Calif.

[21] Appl. No.: 246,215

[22] Filed: Sep. 19, 1988

Related U.S. Application Data

[63] Continuation-in-part of Ser. No. 933,438, Nov. 21, 1986, abandoned.

[51] Int. Cl.$^5$ ............... C01B 21/063; C01B 33/06
[52] U.S. Cl. .............................. 423/344; 264/65; 501/97
[58] Field of Search ............... 423/344, 406; 501/97, 501/98; 264/65

[56] References Cited

U.S. PATENT DOCUMENTS 4,446,242  5/1984  Holt ........................... 423/406
4,459,363  7/1984  Holt ........................... 423/406
4,596,781  6/1986  Carpenter ..................... 501/94

Primary Examiner—John Doll
Assistant Examiner—Lori F. Cuomo
Attorney, Agent, or Firm—Shyamala T. Rajender; Leona L. Lauder; Henry P. Sartorio

[57] ABSTRACT

A combustion synthesis process for the preparation of α-silicon nitride and composites thereof is disclosed. Preparation of the α-silicon nitride comprises the steps of dry mixing silicon powder with an alkali metal azide, such as sodium azide, cold-pressing the mixture into any desired shape, or loading the mixture into a fused, quartz crucible, loading the crucible into a combustion chamber, pressurizing the chamber with nitrogen and igniting the mixture using an igniter pellet. The method for the preparation of the composites comprises dry mixing silicon powder (Si) or $SiO_2$, with a metal or metal oxide, adding a small amount of an alkali metal azide such as sodium azide, introducing the mixture into a suitable combustion chamber, pressurizing the combustion chamber with nitrogen, igniting the mixture within the combustion chamber, and isolating the α-silicon nitride formed as a reaction product.

6 Claims, No Drawings

SYNTHESIS OF FINE-GRAINED α-SILICON NITRIDE BY A COMBUSTION PROCESS

This application is a continuation-in-part of our patent application Ser. No. 933,438 now abandoned filed Nov. 21, 1986.

BACKGROUND OF THE INVENTION

This invention relates generally to combustion synthesis, more specifically to self-propagating high-temperature synthesis (SHS) and still more specifically to the synthesis of α-Si₃N₄ by combustion synthesis.

The United States Government has rights in this invention pursuant to Contract No. W-7405-ENG-48 between the U.S. Department of Energy and the University of California, for the operation of Lawrence Livermore National Laboratory.

Refractory materials, including ceramics, are used in many applications which have specific requirements such as increased resistance to corrosion, greater tolerance to high temperatures, superior mechanical properties, and special electrical characteristics. Some of these applications include electronic devices, cutting tools, industrial machinery, containers for high temperature reactions and the like.

Combustion synthesis is a process which has been known for quite some time, especially in the Soviet Union but has not been widely applied elsewhere. In combustion synthesis, strong exothermic chemical reactions produce heat that causes combustion waves to propagate spontaneously through the reactants, converting them to the desired products, without requiring the addition of thermal energy from an external source. Some of the attractive and desirable characteristics of combustion synthesis for application to ceramics and refractories include: (1) temperatures in the range of 2000°–3500° C. generated without the addition of external energy; (2) the combustion wave which moves rapidly (1.1–10 cm/sec); (3) the high rate of heating at the combustion front; and (4) the volatilization of cation impurities at the combustion front, which creates products that are purer than the reactants. It would be most desirable, therefore, to have available a combustion synthesis route for the production α-Si₃N₄.

U.S. Pat. No. 4,161,512 "Process for Preparing Titanium Carbide" issued July 17, 1979 to A. G. Merzhanov et al, discloses a combustion synthesis route for the preparation of titanium carbide.

U.S. Pat. No. 4,337,463 "Controlled Atmosphere Processing of TiB₂/Carbon Composites", issued Mar. 22, 1983 to L. A. Joo, describes a process for preparing TiB₂-carbon composites by mixing titanium boride and carbon, pitch and other reactants, pressing the mixture into the desired shape and heating the shaped article to 2100° C. in a nitrogen atmosphere and a noble gas atmosphere above 2100° C.

A. G. Merzhanov and co-workers of the USSR claimed that they synthesized Si₃N₄ by a combustion process. A. Merzhanov, "Self-Propagating High Temperature Synthesis", Fizica Khimii Soverm. Problemy, pp 6–45 (1983); A. Merzhanov, "From Academic Idea To Industrial Production", Nauk SSR, vol. 1981, No. 10, pp 30–36 (1981).

Transition metal nitrides (TiN, ZrN, HfN and YN) and composites with aluminum oxide (Al₂O₃) have been synthesized by the combustion of the metal with sodium azide (NaN₃) which is a solid source of nitrogen. The general reaction is given by equation 1.

$$3Me + NaN_3 \rightarrow 3MeN \quad (1)$$

where Me is either Zr, Ti, or Hf metal powder. The combustion is carried out in 1 atmosphere of nitrogen with 100% conversion. These combustion processes are described in U.S. Pat. Nos. 4,446,242 issued May 1, 1984 to J. B. Holt; and 4,459,363 issued July 10, 1984 to J. B. Holt.

Si₃N₄ is an advanced ceramic material which is important because of its wear, corrosion and thermal shock resistance at high temperatures. It would be useful for applications in the construction of heat engines, heat exchangers, cutting tools, radar windows, high temperature bearings and the like. There are three conventional ways of synthesizing Si₃N₄. These three methods are illustrated by reactions shown in the following equations:

$$3Si + 2N_2 \rightarrow Si_3N_4 \quad (2)$$

$$3SiO_2 + 6C + 2N_2 \rightarrow Si_3N_4 + 6CO \quad (3)$$

$$3SiCl_4 - 4NH_3Si_3N_4 - 12\ HCl \quad (4)$$

The first method is the direct nitration of silicon powder in a nitrogen atmosphere. The second is the carbothermic reduction of silica by carbon in a nitrogen atmosphere. Vapor phase reaction of SiCl₄ and NH₄ (ammonia) are shown by equation 4. Some of these methods of the preparation of silicon nitride are exemplified by the following patents:

U.S. Pat. No. 4,117,095 "Method of Making α-Type Silicon Nitride Powder", issued Sept. 26, 1978 to K. Komeya et al, discloses a method for the preparation of high strength α-silicon nitride using α-silicon nitride powder as the starting material and including therein additives such as magnesium and yttrium oxide.

U.S. Pat. No. 4,414,190, "Method of Preparing Silicon Nitride", issued Nov. 8, 1983 to M. Seimiya et al, describes a method of preparing silicon nitride by heating a wet process carbon in the presence of a carbon source, such as a hydrocarbon or solid carbon and a nitrogen source such as nitrogen gas or ammonia.

U.S. Pat. No. 4,590,053 "Method for Producing α-Form Silicon Nitride Fine Powders", issued May 20, 1986 to T. Hashimoto et al, relates to a method for producing α-form silicon nitride powder by heat-treating in a nitrogen atmosphere, a mixture of silicon nitride powder, carbon, magnesium or calcium and/or compounds thereof.

U.S. Pat. No. 3,839,541 "Silicon Nitride Products", issued Oct. 1, 1974 to R. J. Lumby et al, describes a process for the preparation of silicon nitride powder with a nitriding atmosphere at elevated temperatures below the melting point of the silicon powder.

U.S. Pat. No. 4,399,115 "Synthesis of Silicon Nitride", issued Aug. 16, 1983 to K. Sato et al, describes a process for synthesizing silicon nitride by reacting a silicon halide and ammonia at a high temperature.

However, none of the above-described methods is completely satisfactory because of incomplete reaction, the presence of carbon, or because of high material costs and high cost of production.

Combustion of silicon powder even with the use of a solid source of nitrogen such as $NaN_3$ is very unlikely at or near 1 atmosphere of nitrogen pressure normally employed for the reaction. The Si and $N_2$ combustion reaction does not proceed at low nitrogen pressures (1 atm.) because of the high decomposition pressure of $Si_3N_4$. When compared to the dissociation pressure of the transition metal nitrides, it is higher at all temperatures. For example, the decomposition pressure for silicon nitride is approximately 100 atmospheres at 2500° C. The experiments to study the combustion of silicon powder (3 $\mu$ average diameter), as a function of nitrogen pressure, indicates that the powder will not ignite until a pressure of about 450 atmospheres is reached, and even then there is only partial combustion. Only above approximately 680 atmospheres will the silicon powder completely burn with a 92% yield. The yield may be increased to 96% by the addition of up to 20 wt% of $Si_3N_4$ powder to the silicon powder prior to ignition. However, the powder product formed is 88–90% $\beta$-phase $Si_3N_4$. For sintering purposes, the $\alpha$-form is preferable because of enhanced sinterability due to the $\alpha$-$\beta$ phase transition. Also, operating at lower pressures would make the combustion process more economical.

A cost-effective process for the production of $\alpha$-$Si_3N_4$ powder should, therefore, greatly increase its use in high technology applications.

It is, therefore, an object of the present invention to provide a cost effective method for the preparation of $\alpha$-silicon nitride powder.

Another object is to provide a combustion synthesis process for the preparation of $\alpha$-silicon nitride.

Yet another object is to synthesize $\alpha$-silicon nitride at relatively low nitrogen pressures.

Still another object is to provide pure $\alpha$-silicon nitride powder and composites thereof.

Yet another object is to provide $\alpha$-silicon nitride in relatively pure form and in high yields.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention as embodied and broadly described herein, the present invention is directed to a process for the synthesis of $\alpha$-silicon nitride ($Si_3N_4$) in relatively pure form and in greater yields and composites thereof. The method basically comprises dry mixing silicon powder (Si), with an alkali metal azide, such as sodium azide, introducing the mixture into a suitable combustion chamber, pressurizing the combustion chamber with nitrogen, igniting the mixture within the combustion chamber, and isolating the $\alpha$-silicon nitride formed as a reaction product. More specifically, the method comprises powder by the combustion of silicon (Si) powder mixed with sodium azide ($NaN_3$) powder in a nitrogen atmosphere of about 50 atmospheres. The powder mixture is ignited and upon ignition, a combustion wave rapidly self-propagates through the reactants transforming them into a fine grained $\alpha$-$Si_3N_4$ powder. The sodium from the $NaN_3$ is volatilized and consequently is not present in the $Si_3N_4$ powder. Exothermic heat from the chemical reaction provides the high temperature of synthesis so that a furnace is not required for the production of $\alpha$-$Si_3N_4$.

Another embodiment of the present invention provides $\alpha$-silicon nitride composites, such as $\alpha$-$Si_3N_4$-$Al_2O_3$, by the combustion of the reactants shown in equation 5.

$$9SiO_2 + 12Al + 4NaN_3 \rightarrow 3Si_3N_4 + 6Al_2O_3 + 4Na \qquad (5)$$

The pressure of nitrogen required for the reaction may be lowered by the addition of a diluent of either $Al_2O_3$ or $Si_3N_4$.

DETAILED DESCRIPTION OF THE PREFERRED EMBODIMENT

The present invention is a process for the synthesis of $\alpha$-silicon nitride ($Si_3N_4$) by the combustion of silicon (Si) mixed with an alkali metal azide such as sodium azide ($NaN_3$), in a nitrogen atmosphere in the range of about 50 to 100 atmospheres, preferably about 50 atmospheres. The mixture which, optionally in the powdered form, is ignited using any convenient ignition source such as a coil of tungsten wire, or an electric arc or graphite strip and the like. Upon ignition, a combustion wave rapidly self-propagates through the reactants transforming them into the desired product, a fine grained $\alpha$-$Si_3N_4$ powder. The sodium from the $NaN_3$ is volatilized and consequently is not present in the $Si_3N_4$ powder. Exothermic heat from the chemical reaction provides the high temperature for synthesis so that a furnace is not required for the production of $\alpha$-$Si_3N_4$.

The optimum procedure for synthesizing $\alpha$-$Si_3N_4$ with a combustion of silicon powder is described below. Silicon (average particle size of 3 $\mu$) is dry mixed with $NaN_3$ according to the ratio given in equation 6.

$$9Si + 4NaN_3 \rightarrow 3Si_3N_4 + 4Na \qquad (6)$$

The mixed powder is cold-pressed into a cylindrical form or poured into a quartz crucible. An igniter pellet of Ti-1.5B is placed on top. The samples are loaded on a platen which is attached by the electrode to the top flange of the combustion chamber. The chamber is pressurized with nitrogen from about 50-100 atm. A heated tungsten coil ignites the pellet which ignites the silicon-$NaN_3$ mixture and the combustion is completed within a few seconds. X-ray analysis of the powder confirms the product to be 98%–100% $\alpha$-$Si_3N_4$. The use of the $NaN_3$ is important because it enables the combustion to be completed at relatively low nitrogen pressures. The exact over-pressure of nitrogen required can be adjusted somewhat by the addition of $Si_3N_4$ as diluent. This means that the over pressure of 50 atmospheres can be lowered by the addition of the $Si_3N_4$ dilutent to the powder mixture of silicon and $NaN_3$. The average particle size of $Si_3N_4$ is about 1 $\mu$ or below depending on the pressure and amount of diluent.

Composite materials such as silicon nitride-metal oxide composites, such as, for example, silicon nitride-aluminum oxide ($Si_3N_4$-$Al_2O_3$) may be formed by the combustion of the reactants shown in equation 5.

$$9SiO_2 + 12Al + 4NaN_3 \rightarrow 3Si_3N_4 + 6Al_2O_3 + 4Na \quad (5)$$

The starting materials for the composites may be silica or silicon oxide and a metal oxide or the metal depending on whether silicon or silicon dioxide is the starter material. Composites using other metals oxides such as the oxides of Ti, Zr, Hf may also be similarly prepared. Again, the over-pressure of nitrogen may be adjusted by the addition of a diluent of either $Al_2O_3$ or $Si_3N_4$.

For the preparation of the composites, silicon dioxide-aluminum composites being exemplary thereof, 7.21 gm of $SiO_2$, 4.32 gm of aluminum, 3.47 gm of $NaN_3$ were mixed and thoroughly blended (in a blender) for about 5 min. 15 gms of the powder mixture was poured into a fused quartz crucible, about 1.9 cm in diameter and 6.4 cm high. An igniter pellet of $Ti_{1.5}B$ was placed on top of the powder such that the top of the pellet was located just below the tungsten coil, which is heated to ignite the pellet, which in turn ignited the mixture. The crucible was mounted on a platform attached to a seal ring. The crucible-platform assembly was loaded into a combustion chamber. The chamber was then evacuated, pressurized with nitrogen and then ignited by heating the tungsten coil. The resulting composite powder was removed and either sintered or cold pressed into desired shapes.

Without the presence of sodium azide, at nitrogen pressures of less than about 340 atmospheres, there was no ignition of the reaction mixture.

Between, about 340 and about 600 atmospheres, there was a partial burn, i.e., the combustion wave did not propagate throughout the reaction mixture to produce the desired product.

At about 680 atmospheres of nitrogen pressure, and with no sodium azide present, only 12% of α-silicon nitride was produced.

At about 850 atmospheres of $N_2$ pressure and no $NaN_3$, only 8.5% of the product formed was α-silicon nitride.

At about 1000 atmospheres of $N_2$ pressure and no $NaN_3$, only 7% of the produce was α-silicon nitride. At 3000 atmospheres of $N_2$, the yield of a-$Si_3N_4$ was about 2%. With increasing nitrogen pressure, the yield of a-silicon nitride dropped.

Using sodium azide and silicon powder in the reaction mixture produced α-silicon nitride in appreciable amounts even at 50 to 100 atmospheres of nitrogen pressure.

Use of sodium azide and silicon powder also lowered the combustion temperature sufficiently even in the pressure range of 50-100 atmospheres.

With the addition of sodium azide in an approximate ratio of 1:2 (azide:silicon), greater than about 98% of the product formed was a-silicon nitride, at a nitrogen pressure of about 280 atmospheres.

This invention permits the synthesis of α-$Si_3N_4$ at relatively low pressures without the use of a high temperature furnace and at rapid reaction time (within 3-5 seconds for small samples). These procedures provide a very economical process for the synthesis of α-$Si_3N_4$-metal oxide composite materials. Preferred metal oxides include but are not limited to aluminum oxide, zirconium oxide, titanium oxide and hafnium oxide.

While a particular embodiment of the invention and specific materials and parameters have been illustrated and described, the invention is not limited to the particular illustrations or embodiments so described. The above embodiments were chosen and described in order to explain best the principles and the practical application of the subject invention thereby to enable those skilled in the art to utilize the invention in various other embodiments and various modifications as are suitable for the particular use contemplated. The foregoing description of preferred embodiments of the invention have been presented therefore for purposes of illustration and description. It is not intended to be exhaustive or to limit the invention to the precise form disclosed, and obviously many modifications and variations are possible in light of the above teaching. It is intended that the scope of the invention be defined by the claims appended hereto.

We claim:

1. A method for the combustion synthesis of α-silicon nitride comprising the steps of:
    dry mixing silicon powder with an alkali metal azide;
    introducing the mixture in a combustion chamber;
    pressurizing said chamber with nitrogen at a pressure in the range of about 50 to 100 atmospheres;
    igniting said mixture within said chamber; and
    isolating said α-silicon nitride formed.

2. The method of claim 1, additionally including the step of cold pressing said mixture prior to introducing it in said chamber.

3. The method of claim 2, wherein a pellet of $Ti_{1.5}B$ is placed on said cold pressed mixture prior to introducing said mixture in said chamber.

4. The method of claim 1, wherein said mixture is molded prior to introducing it in said chamber.

5. The method of claim 1, wherein said silicon and said azide are mixed in a ratio of about 9:4.

6. The method of claim 5, wherein said azide is sodium azide.

* * * * *